United States Patent
Cadwallader

(10) Patent No.: US 12,222,234 B2
(45) Date of Patent: Feb. 11, 2025

(54) ISOLATED INDUSTRIAL FLOAT ASSEMBLY

(71) Applicant: Zach Cadwallader, Conroe, TX (US)

(72) Inventor: Zach Cadwallader, Conroe, TX (US)

( * ) Notice: Subject to any disclaimer, the term of this patent is extended or adjusted under 35 U.S.C. 154(b) by 0 days.

(21) Appl. No.: 17/666,805

(22) Filed: Feb. 8, 2022

(65) Prior Publication Data

US 2022/0252446 A1     Aug. 11, 2022

Related U.S. Application Data

(60) Provisional application No. 63/146,997, filed on Feb. 8, 2021.

(51) Int. Cl.
*G01F 23/76*     (2006.01)
*G01F 23/64*     (2006.01)

(52) U.S. Cl.
CPC .............. *G01F 23/76* (2013.01); *G01F 23/64* (2013.01)

(58) Field of Classification Search
CPC ................................. G01F 23/76; G01F 23/64
USPC .. 73/290 R, 298, 305, 309, 319, 322.5, 308, 73/322
See application file for complete search history.

(56) References Cited

U.S. PATENT DOCUMENTS

| | | | |
|---|---|---|---|
| 1,674,038 A | 4/1924 | Glass | |
| 2,061,175 A | 11/1936 | Staber | |
| 2,237,461 A | 12/1937 | Tokheim | |
| 3,366,266 A | 1/1968 | Heartstedt | |
| 3,409,165 A | 11/1968 | Creith | |
| 3,474,931 A | 10/1969 | Daniels et al. | |
| 3,493,143 A | 2/1970 | Thompson et al. | |
| 4,238,953 A | 12/1980 | Laverman | |
| 4,260,068 A | 4/1981 | Mccarthy et al. | |
| 4,243,151 A | 6/1981 | Bruening | |
| 4,468,975 A | 9/1984 | Sayles et al. | |
| 4,819,484 A * | 4/1989 | White | G01F 23/30 73/309 |
| 5,103,674 A * | 4/1992 | Outwater | G01F 23/76 376/258 |
| 5,138,891 A | 8/1992 | Johnson | |
| 5,230,436 A | 7/1993 | Vaughn | |
| 5,423,446 A | 6/1995 | Johnson | |

(Continued)

FOREIGN PATENT DOCUMENTS

| | | | | |
|---|---|---|---|---|
| CA | 2541654 A1 * | 3/2007 | ............. | B60P 3/228 |
| CN | 1517684 A * | 8/2004 | ......... | G01F 23/0038 |

(Continued)

*Primary Examiner* — Robert R Raevis
(74) *Attorney, Agent, or Firm* — WILLIAMS INTELLECTUAL PROPERTY

(57) ABSTRACT

An isolated industrial float assembly is sized to fit interior to an existing gauge pole to signal a fluid level to an observer while preventing or lowering emissions from volatilization of fluids from the gauge pole. The isolated industrial float assembly includes a positively buoyant core manufactured from hydrocarbon resistant foam sealed within a shell. End caps enclose the shell. A vertical member secures the end caps tautly in position by connection with fasteners. Assembly and disassembly of the float assembly is enabled to replace parts as needed. The buoyancy of the core is sufficient to cause the float assembly to maintain position at the fluid-atmosphere interface, even in embodiments where the shell is fabricated of stainless steel.

18 Claims, 9 Drawing Sheets

(56) References Cited

U.S. PATENT DOCUMENTS

| | | |
|---|---|---|
| 5,474,198 A | 12/1995 | Edvardsson |
| 5,560,509 A | 10/1996 | Laverman et al. |
| 5,628,421 A | 5/1997 | Jolly |
| 5,829,621 A | 11/1998 | Laverman et al. |
| 7,721,903 B2 | 5/2010 | Ben Afeef |
| 8,061,552 B2 | 11/2011 | Hiner |
| 8,272,524 B2 | 9/2012 | Alajlani et al. |
| 8,579,139 B1 | 11/2013 | Sablak |
| 2009/0077936 A1 | 3/2009 | Sterner |

FOREIGN PATENT DOCUMENTS

| | | | | |
|---|---|---|---|---|
| CN | 102151421 | | 1/2011 | |
| CN | 111103039 A | * | 5/2020 | ............. G01F 23/72 |

* cited by examiner

ISOLATED INDUSTRIAL FLOAT ASSEMBLY

CROSS-REFERENCE TO RELATED APPLICATIONS

This nonprovisional application for utility patent claims the priority of provisional application No. 63/146,997 filed on 8 Feb. 2021

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Many floats are seen in the prior art for use in the hydrocarbon and petrochemical industry. Generally, such floats are needed when storing fluid compounds (such as hydrocarbons) to prevent volatilization and loss of volatile fractions from fluid held in storage vessels.

Floats generally are devised to float at the surface of such fluids, to seal the fluid interior to the storage vessel across a range of depths and associated levels. Volatilization of fluids is not only costly, Federal regulations control the maximum emissions allowable from such storage vessels, to regulate pollution and maintain air quality. In the coming years, such regulations are likely to increase and be increasingly enforced.

Storage vessels particularly subject to volatilized emissions include gauge poles or guide poles, used to measure interior levels of associated storage vessels. These gauge or guide poles are typically tubular and serve to provide visual indication of an associated volume of liquid in an associated vessel. Gauge Pole Floats (also, "Guide Pole Floats", frequently termed "PIGs" in the industry) are generally obround or cylindrical members having a positive buoyancy in petrochemical fluids such as hydrocarbons. They are sized with a radius appropriate to stop up the gauge or guide pole appreciably, to lessen vapor loss while still remaining capable of vertical movement within the pole upon the changing level of the fluid stored therein. These "PIGS" typically include a float chain by which they may be retrieved for removal, repair, or inspection.

PIGS must be lightweight, positively buoyant, resistive to corrosion in hydrocarbons, and engineered to effectively seal the gauge pole while facilitating movement therein upon a changing fluid level.

FIELD OF THE INVENTION

The present isolated industrial float relates to an improved gauge pole float design, combining durable, lightweight materials and a utile assembly for emissions prevention in gauge poles.

SUMMARY OF THE INVENTION

Many floats seen in the art swell with the fluid in which they are floated, to expand and seal to the gauge pole. This can cause blockages; floats captured in the gauge pole can become unable to move freely with the changing level of fluid therein. Further, absorption of fluid can alter the buoyancy of the floats, resulting in sinking. Such floats are frequently incapacitated and require retrieval sometimes in costly and difficult ways.

The present isolated industrial float assembly offers useful improvements in the gauge pole arts. Sized for position interior to an existing gauge pole, the instant isolated industrial float assembly includes a positively buoyant core encapsulated by a non-expansive, durable exterior. The present isolated industrial float assembly does not expand by absorption of fluid to plug the gauge pole, rather it includes means to maintain position at the surface of the fluid to enable vertical movement thereat while reducing volatilization of the lighter fractions vaporizing from the surface.

The instant isolated industrial float assembly, therefore, includes a positively buoyant core. In an example embodiment contemplated herein, the core is comprised of polymeric methylene diphenyl diisocyanate and polyol closed cell foam, chemically resistant to hydrocarbon exposure, or other polyurethane, plastic, foam, or such substance as has a low density and positive buoyancy. The float assembly occupies a volume sufficient to displace a mass of fluid exceeding the mass of the isolated industrial float assembly as a whole. Thus, with mind to the additional materials and structures comprising the float assembly, the core's positive buoyancy is key. This buoyancy force may further include the mass of a major portion of a line contemplated for use in retrieving the float assembly to ensure the flat assembly remains afloat at the surface even when excess slack line weights the float down some.

The core is bounded by a tubular, durable, non-corrosive shell. In the example embodiment contemplated herein, the shell is comprised of high grade 316 stainless steel. Other durable, non-corrosive materials are contemplated for use as the shell, including other non-reactive, non-corrosive metals, plastics, aramids, and other polymers suited for the purpose. In an example embodiment depicted herein, the core is bounded at upper and lower ends by end caps and, in some embodiments, discoid plate members that sealably enclose upper and lower ends of the float assembly. Discoid plate members may be manufactured of high density polyethylene, or other generally lightweight plastic or polymeric material or other durable material resistive to corrosion when exposed to petrochemicals. In another example embodiment disclosed herein, an end cap may be welded or fused or otherwise directly attached to the lower end of the shell, the upper end enclosed by an end cap having a discoid plate member, as previously described.

A vertical member is disposed along a central longitudinal axis, from top to bottom of the float assembly, to maintain cohesion of the parts as an integral whole. The vertical member may include threaded ends to which threadable fasteners are attachable to tautly engage endcaps and the discoid members in position. A looped member may also be included, threaded or molded through the core with an anterior arch disposed overtop the upper end of the float assembly, to serve as a hook for attachment of a non-corrosive cord or line by which the float assembly may be retrieved from position interior to the gauge pole. The buoyancy of the float assembly may be calculated to include displacement of a mass of fluid to include an equivalent mass of a major length of the associated cord or line whereby the float does not sink even with the weight of a major length of the line added thereto.

In an example embodiment disclosed herein, the vertical member may secure the end caps in position by threaded engagement therethrough. In another example embodiment contemplated here, the vertical member may connect with a fastener that is welded of fused to the interior surface of the lower end cap in such embodiments where the lower end cap is welded or fused to enclose the lower end of the shell.

Float assembly therefore maintains positive buoyancy interior to a gauge pole to demark the height of the fluid therein as well as to lessen volatilization of lighter fractions into the atmosphere. The upper end cap may include a fringe or skirting disposed to present a circumference overhanging the shell. The diameter across the upper skirting is larger than the diameter of the shell and may approximate the inner diameter of the gauge pole. The fringe or skirting therefore may contact the gauge pole and serves to seal the gauge pole to prevent emissions of volatile fractions while enabling the float assembly to rise and fall within the gauge pole upon the surface of the fluid therein contained.

The float assembly may further include bright colors or reflective surfaces to render visibility in the visible spectrum or other regions of the electromagnetic spectrum whereby the float assembly signals the fluid level in the gauge pole by means of visual inspection or by remote sensing means. The float assembly is lightweight, non-corrosive in hydrocarbons, and sized appropriately to move freely with the changing liquid-atmosphere interface while positioning the skirting of the upper end cap in contact with the inner diameter of the gauge pole to lessen emissions from the gauge pole.

Thus, has been broadly outlined the more important features of the present isolated industrial float assembly so that the detailed description thereof that follows may be better understood and in order that the present contribution to the art may be better appreciated.

For better understanding of the isolated industrial float assembly, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, example of the instant isolated industrial float assembly employing the principles and concepts of the present isolated industrial float assembly and generally designated by the reference number 10 will be described.

Figure 1:
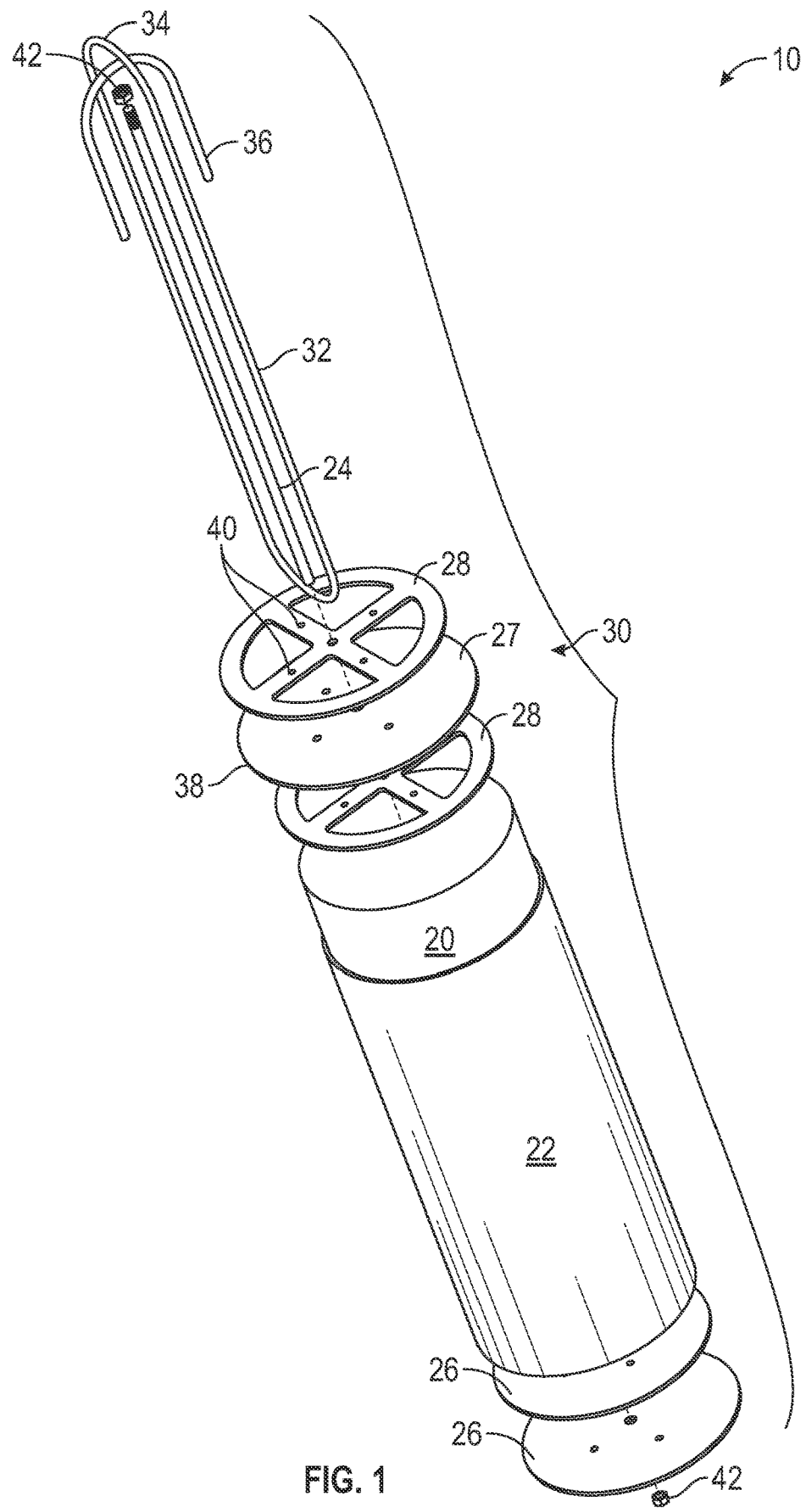
FIG. 1 is an exploded view of an example embodiment.

As shown in FIG. 1, isolated industrial float assembly 10 includes positively buoyant core 20. Core 20 is contemplated to be rendered of a hydrocarbon resistant, non-corrosive foam with a high positive buoyancy to compensate for the other components of the float assembly and, in some embodiments, to accommodate the added mass of a line (not shown) used in retrieving the float. Foam contemplated includes polymeric methylene diphenyl diisocyanate and polyol closed cell foam, or other foams chemically resistant to hydrocarbon exposure. Other polyurethane, plastic, foams, or such substances as have a low density and positive buoyancy and resistant to petrochemicals are contemplated as within scope of this disclosure.

Core 20 is bounded by impermeable tubular shell 22. In the example embodiment depicted, tubular shell 22 is an open-ended cylinder wrought from high grade 316 stainless steel. In all embodiments, shell 22 is durable and impervious. Vertical member 24 is disposed along a medial longitudinal axis through core 20 and, in this example embodiment, fastened endwise on exterior sides of end caps 26 and 27. For reinforcement, additional discoid members 28 may be employed to secure vertical member 24 through core 20 and fasten end caps 26, 27 in position to sealably enclose core 20. Such discoid members 28 may include open sections to reduce weight of the float assembly 10.

Outer diameter of float assembly 10 is configured to be slightly less than inner diameter of gauge pole (see FIG. 9) in which float assembly 10 is disposed whereby float assembly 10 is enabled to travel with changing fluid levels interior to said gauge pole and remain with at least upper end 30 generally enclosing the gauge pole to lessen emissions of volatile fractions volatilizing into the atmosphere therefrom. To accomplish this, upper end cap 27 may include a skirting or fringe 38 disposed circumferentially around end cap 27, or extended therefrom, devised to contact the inner diameter of the gauge pole (see detail view in FIG. 9). In some embodiments, skirting 38 may consist of a flexible, fabric material, or flexible rubberlike material, disposed between discoid members 28 and end cap 27 or may be a flange rim-wise extended from end cap 27, as case may be. See, e.g., FIG. 2.

As shown in FIG. 1, threaded or molded through core 20 is looped member or grapple member 32. In the example embodiment depicted in FIG. 1, looped member or grapple member 32 is an ovoid pole disposed to project anterior hoop 34 arched over upper end 30 of float assembly 10. Second hoop member 36 may likewise be molded or threaded into or through end cap 27 or core 20. Second hoop member 36 is shown here as hooped, however it is to be understood that second hoop member 36 is contemplated to be disposed as a loop in some embodiments, similar to looped member 32, but of appropriate dimensions to present an upper arched portion in close proximity and underneath looped member 32 anterior hoop 34. Second hoop member 36 is shown here as a hoop for the purposes of illustration. In like capacity, looped member 32 may be disposed as a hoop. See, e.g., FIG. 2. However, as shown in this example embodiment, disposing looped member 32 through a substantial portion of the core 20 preserves purchase of the looped member 32 interior to the float assembly and has been shown to be an effective design.

Figure 2:
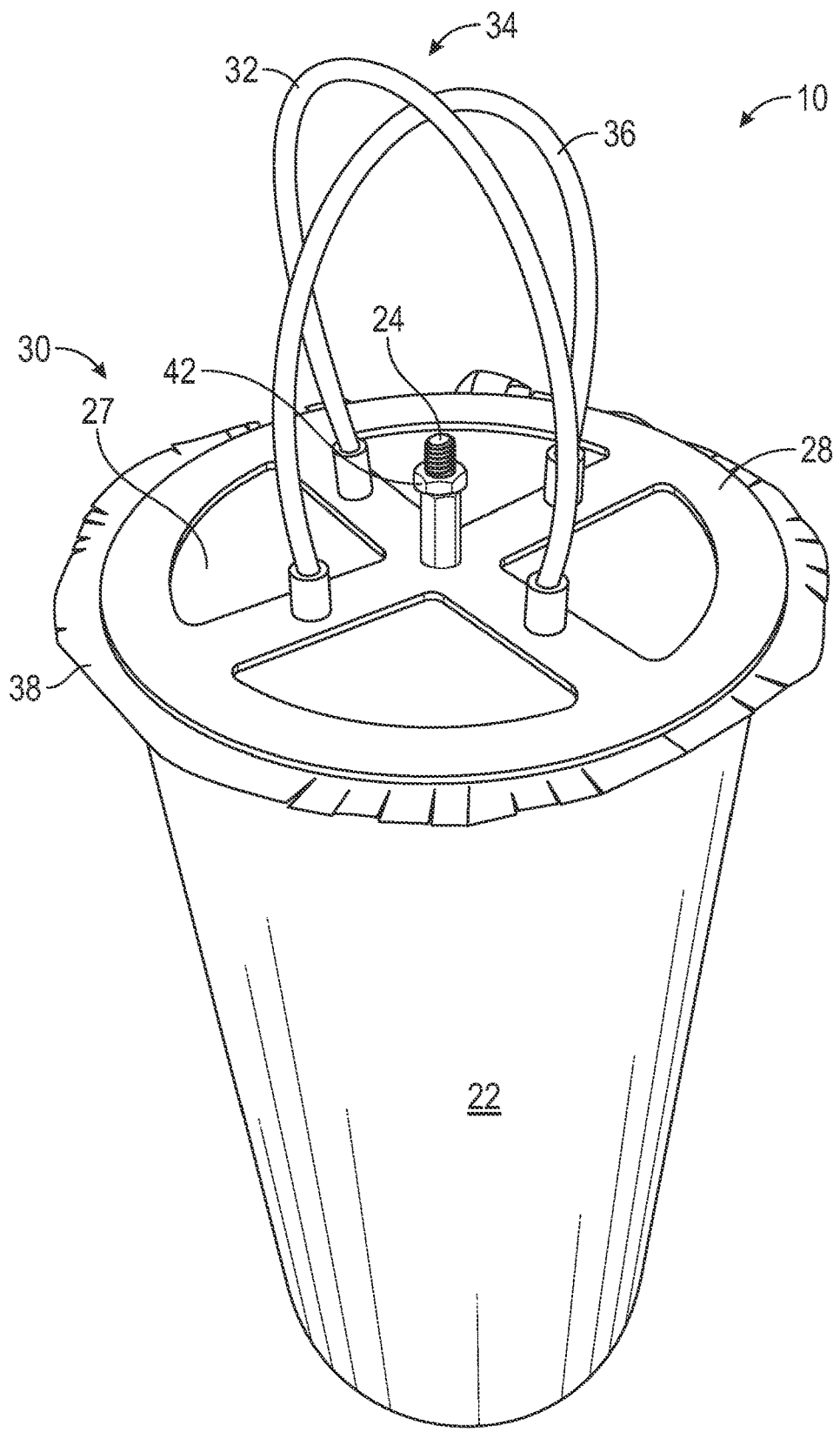
FIG. 2 is a raised perspective view of an example embodiment.

As is shown in FIG. 2, looped member 32 and second hoop member 36 arch over upper end of float assembly 10 generally disposed at right angles. Looped member 32 and second hoop member 36 are there disposed for engagement with cord or chain or other line (see FIG. 9) or hook (not shown) by which float assembly is retrievable from the gauge pole in which float assembly 10 is disposed to mark the level of the associated storage vessel and reduce volatilization of the fluid into the atmosphere. Cord, chain, or line (see FIG. 9) is contemplated to be made of noncorrosive lightweight material—such as nylon or other synthetic polymer fiber or metal. Positive buoyancy of core 20 may factor the weight of a major portion of the line with which the float assembly 10 is devised for use. In such cases where the line is attached to the float assembly 10 and maintained in contact with the float assembly 10 during use, the excess line does not sink the float assembly 10 at high fluid levels.

As shown in FIG. 2, looped member 32 and second hoop member 36 may comprise single hoops of flexed and taut material, and alternatively secure to at least one of the discoid members 28 at the upper end 30 of float assembly 10 by engagement therethrough. See also FIG. 7. In this example embodiment depicted, end cap 27 may include flexible skirting 38 extending exteriorly from the float assembly 10 to reach the inner diameter of the guide pole in which float assembly 10 is disposed. In this example embodiment, skirting 38 may flexibly engage against the inner surfaces of the guide pole to seal the guide pole and prevent emission of volatile fractions volatilizing from the surface. See, e.g., FIG. 9.

Referring again to FIG. 1, apertures 40, disposed on discoid members 28 and end cap 27 accommodate looped member 32 and second hoop member 36 therethrough. Fasteners 42 applied endwise to vertical member 24 seal end caps 26, 27 and discoid members 28 into place and tautly engage looped member 32 and second hoop member 36 in position. Discoid members 28 may be brightly colored, have a high albedo, include reflective or fluorescent surfaces, to increase visibility for determination of the fluid level by visual inspection.

Figure 3:
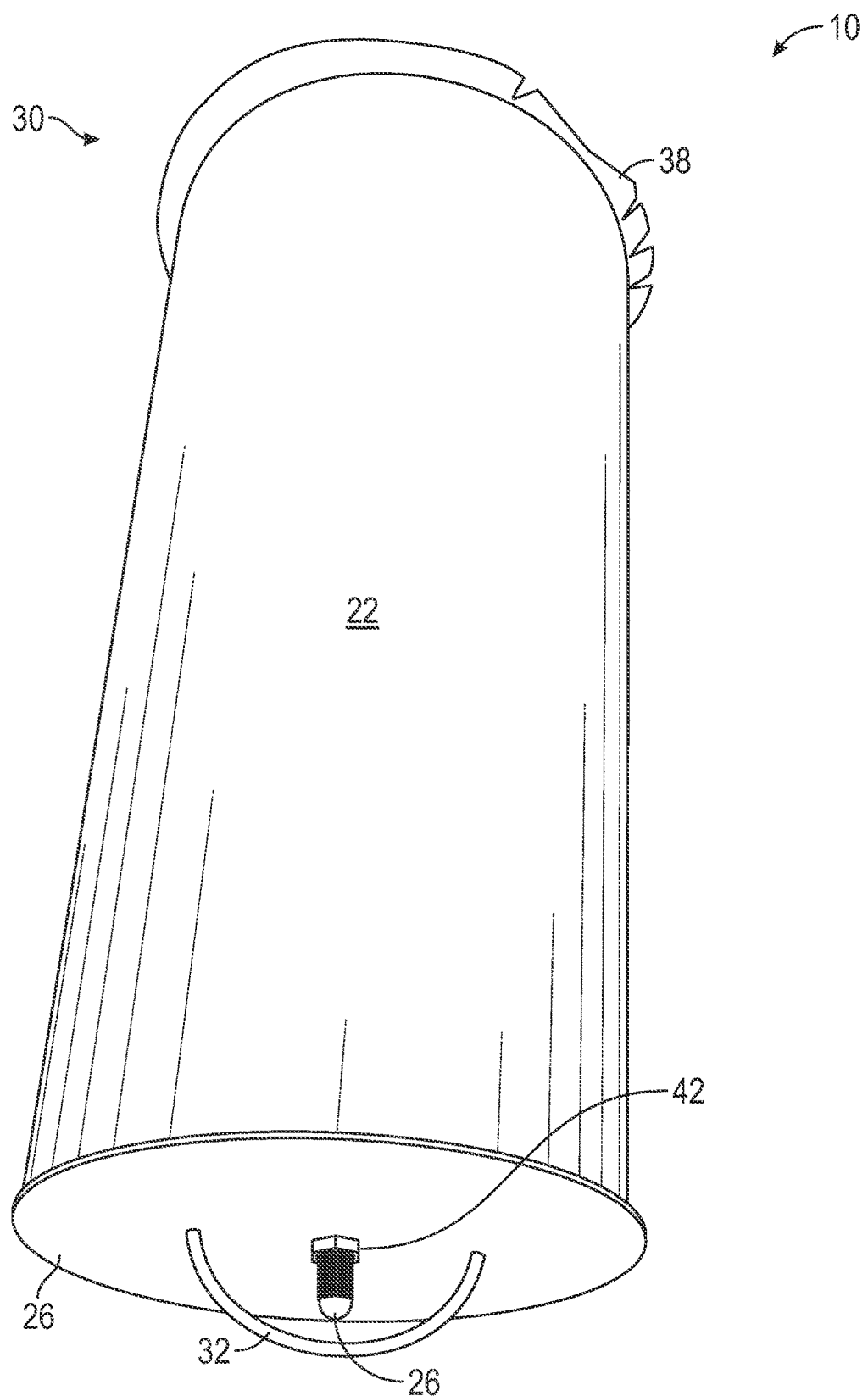
FIG. 3 is a lower perspective view of an example embodiment.

FIG. 3 shows the example embodiment of FIG. 2 in lowered perspective view. Lower end cap 26 is secured tautly and sealably engaged to lower end of shell 22 by threaded engagement of the vertical member 24 therethrough. Vertical member 24 engages threadably into fastener 42. Float assembly 10 is therefore readily disassemblable and its components readily interchanged as needed. In this example embodiment, looped member 32 is disposed through lower end cap 26 to provide a means of purchase at the lower end of the float assembly 10 in the event float assembly 10 is inverted.

Figure 4:
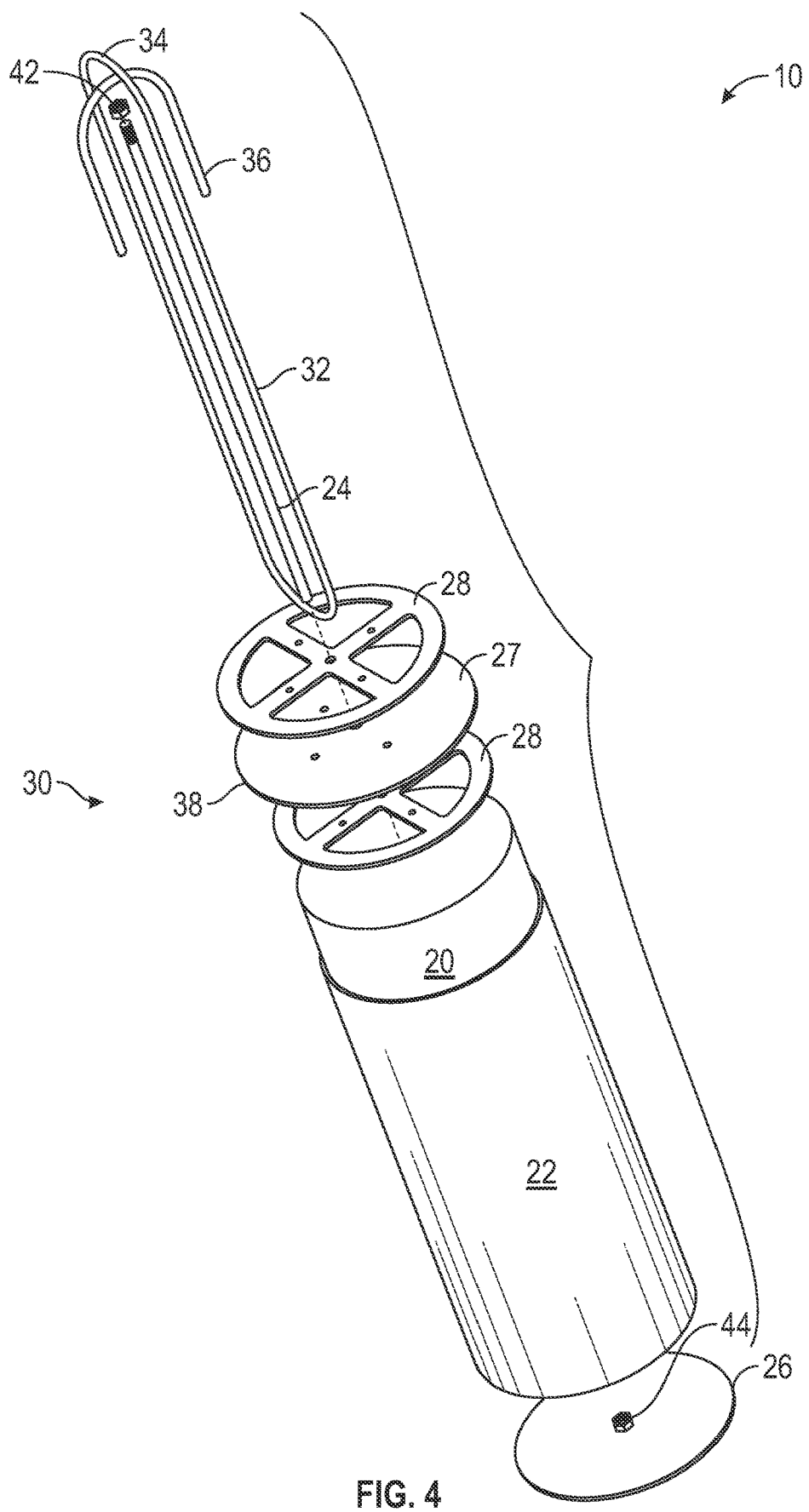
FIG. 4 is an exploded view of an example embodiment with a lower end cap welded, fused, or directly attached to a lower end of a shell.

FIG. 4 shows an example embodiment wherein end cap 26 is welded to enclose lower end of shell 22. In this example embodiment, end cap 26 may be rendered of the same steel or durable, impervious material as tubular shell 22, or, where other material comprises shell 22, such other material as matingly, sealably, or fusedly engages therewith. In this example embodiment, vertical member 24 may be welded, fused, or otherwise fastened in endwise contact with lower end cap 26. As shown in this example embodiment, vertical member 24 may threadably engage endwise into a fastener member 44 welded, fused, or directly attached to interior surface of lower end cap 26. Upper end cap 27 is appreciably the same as shown in FIGS. 1-3 herein and may comprise discoid members 28 to maintain upper end cap 27 in position and supportively engage looped member and hoop member thererthrough while reducing mass of the float assembly 10. In like capacity as shown in FIG. 1, looped member 32 and second hoop member 36 may be molded into core 20 and be disposed run through a substantial portion of core 20. Alternatively, as shown in FIG. 2, looped member and second hoop member may instead be derived of a flexible cord of material disposed secured through end cap 26 only and held in position by fasteners 42 (see, e.g., FIG. 7).

Figure 5:
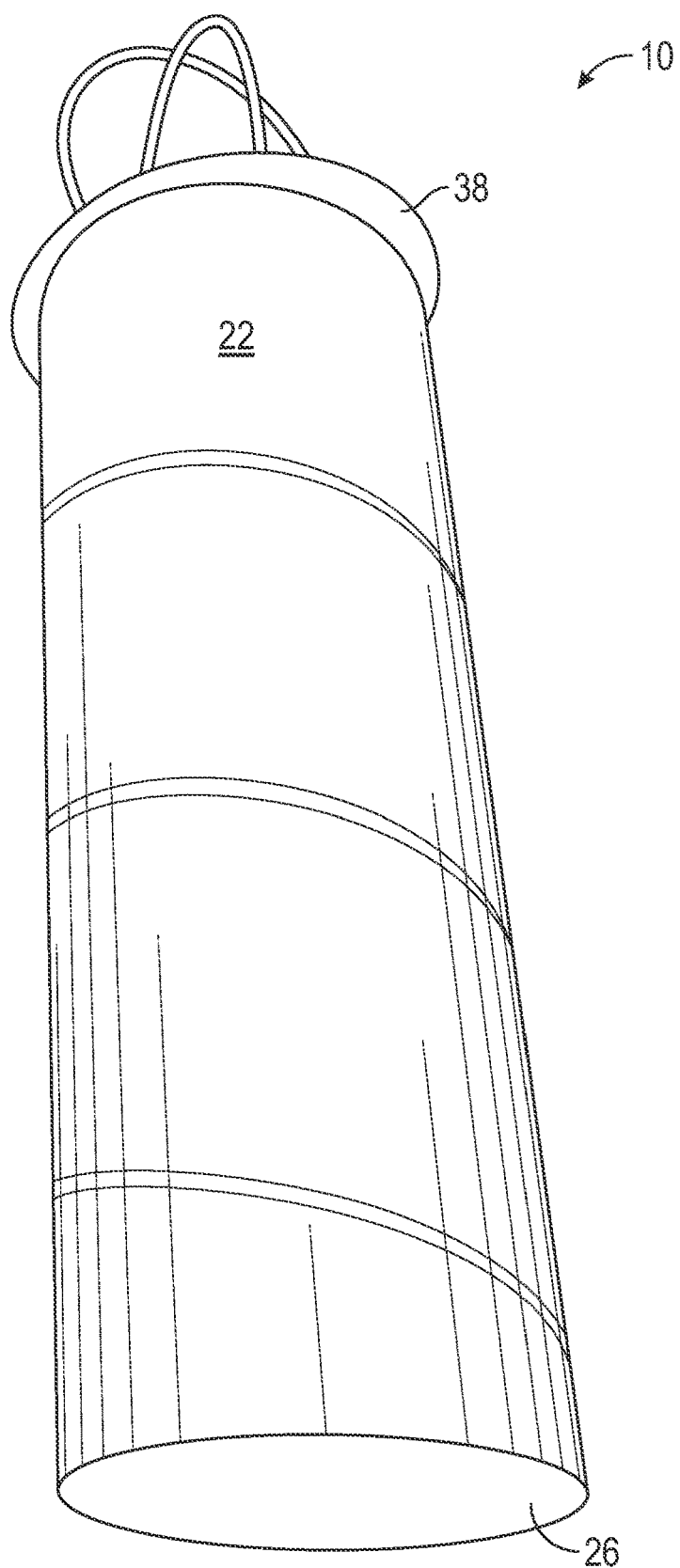
FIG. 5 is a lower perspective view of the example embodiment where the lower end cap is welded, fused, or directly attached to the lower end of the shell.

FIG. 5 illustrates a lowered perspective view of an example embodiment similar to the embodiment shown in FIG. 4. Skirting 38 is shown extending overhanging shell 22. As previously described, skirting 38 is devised to engage in contact with the gauge pole without impeding vertical motion of the float assembly interior to the gauge pole.

Figure 6:
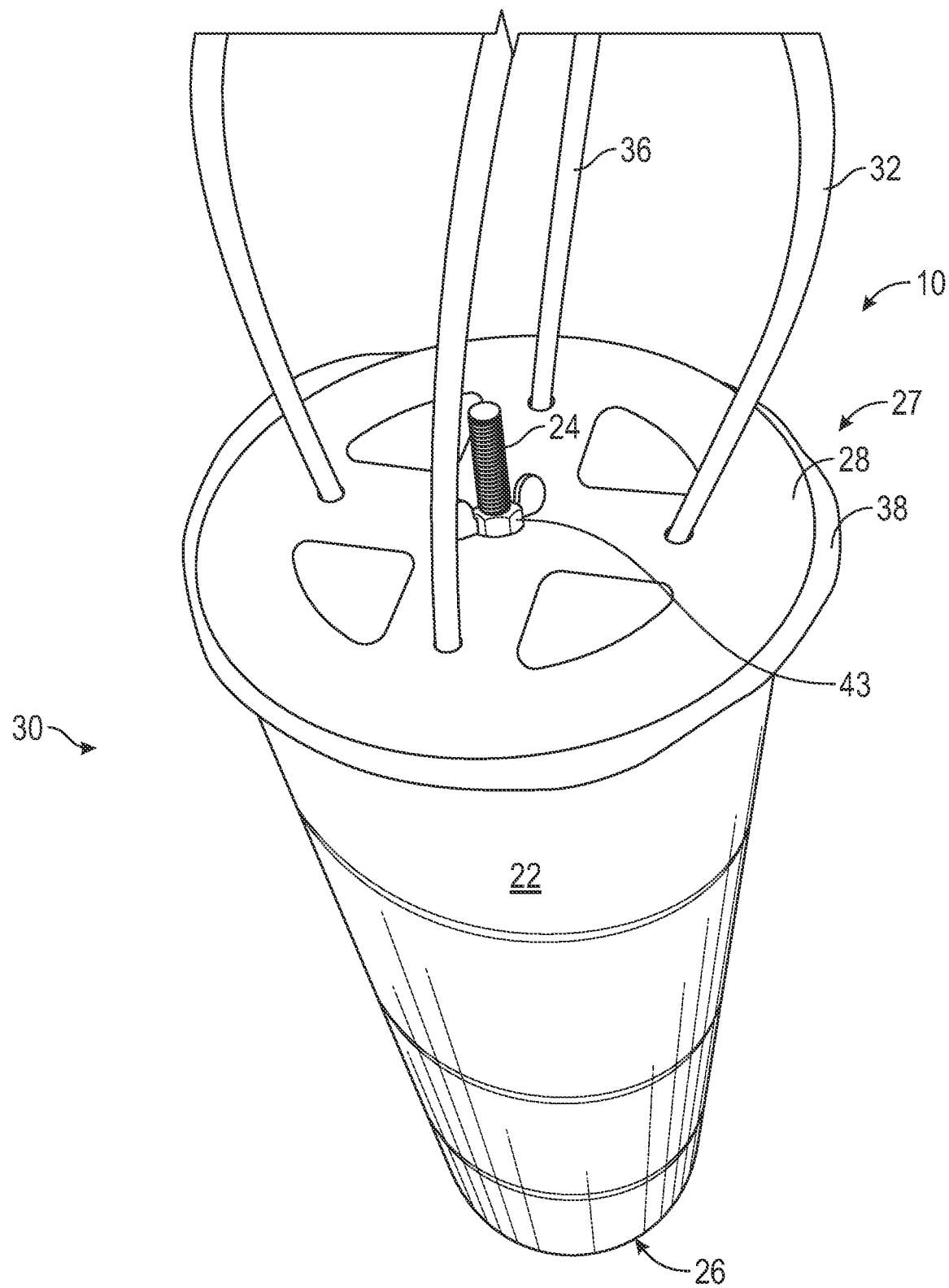
FIG. 6 is a raised perspective view of the example embodiment shown in FIG. 5.

FIG. 6 illustrates a raised perspective view of an example embodiment similar to the embodiment shown in FIG. 5. Vertical member is threadably secured through end cap 27, here with wingnut 43. Wingnut may be tightened to tautly engage end cap 27 and ensure sealable attachment. Skirting 38 is flexible and does not prevent movement of float assembly 10 within the gauge pole with changing fluid levels.

Figure 7:
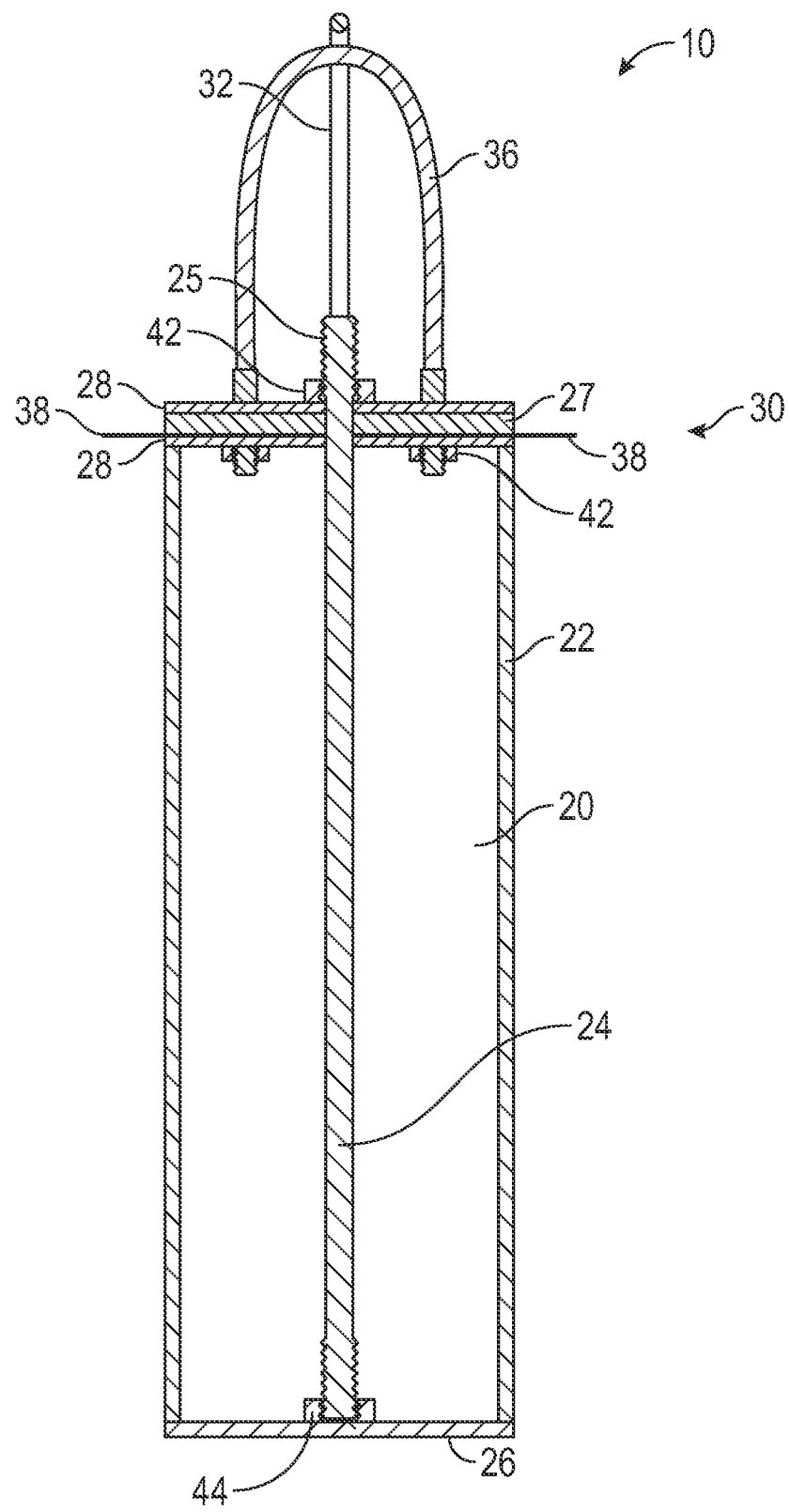
FIG. 7 is a longitudinal cross-section view of the example embodiment shown in FIG. 6.

FIG. 7 illustrates an example embodiment in longitudinal cross-section. Discoid members 28 are shown disposed on either side of upper end cap 27. In this example embodiment, skirting 38 is shown as a separate element disposed in between end cap 27 and discoid members 28. Threaded fastener member 44 is welded to interior surface of lower end cap 26. Vertical member 24 threadably engages endwise into fastener member 44. Vertical member 24 presents upper end 25 to threadably engage with fastener 42 through upper end cap 27. Looped member 32 and second hoop member 36 are shown interiorly engaged though the upper end cap 27 and discoid member 28 into fasteners 42. Looped member 32 and second hoop member 36 may comprise flexible cords or rods disposed hooped overtop upper end cap 27.

Figure 8:
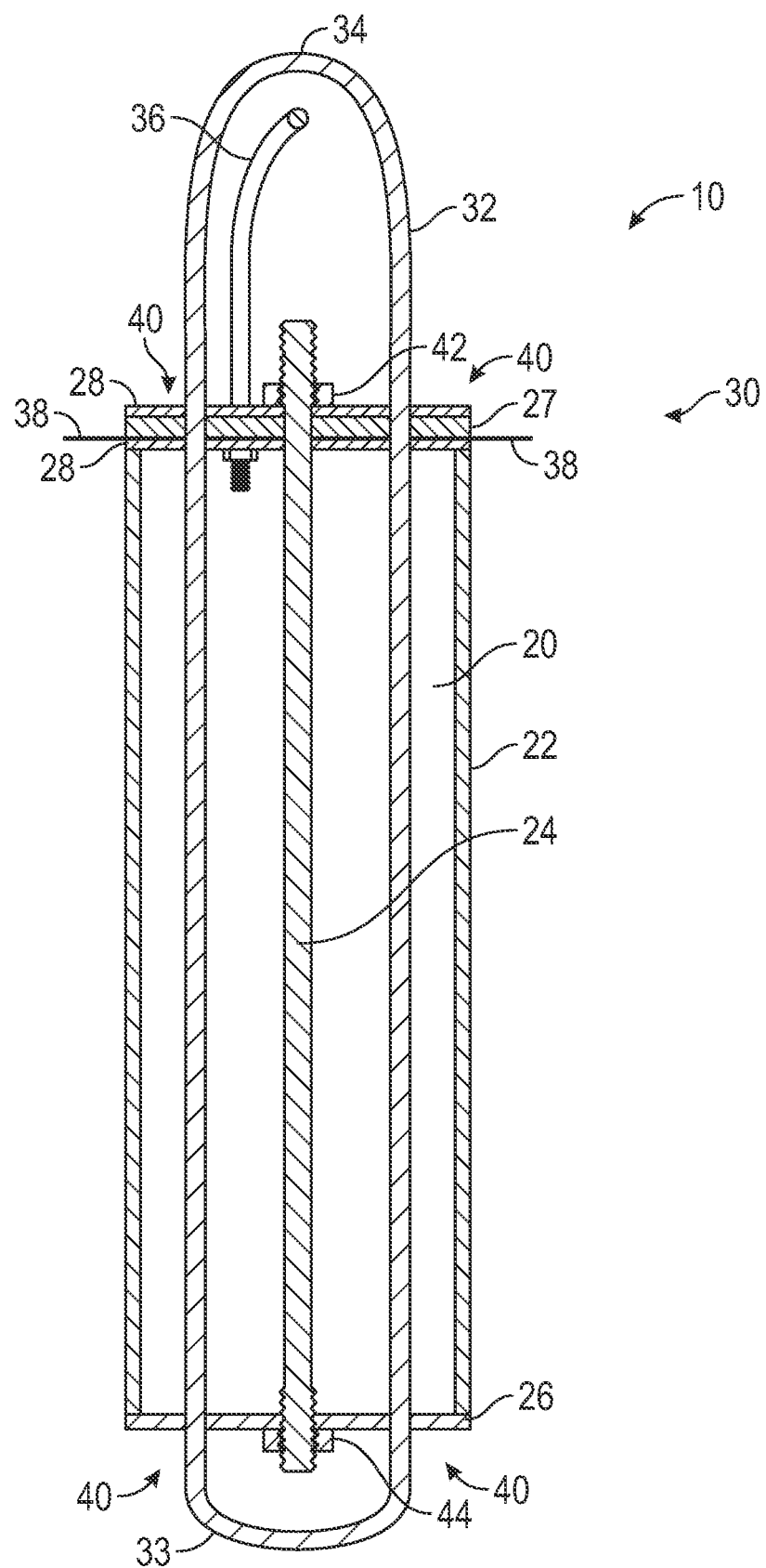
FIG. 8 is a longitudinal cross-section view of the example embodiment shown in FIG. 1.

FIG. 8 illustrates the embodiment shown in FIG. 1 in longitudinal cross-section. Lower end cap 26 is secured in place to enclose the lower end of shell 22 by action of threaded member 44 engaging lower end of vertical member 24. Looped member 32 is disposed through core 20 and presents a lower loop 33 spanned over lower end cap 36. Second hoop member 36 is engaged through upper end cap 27 in like manner as shown in FIG. 7.

Figure 9:
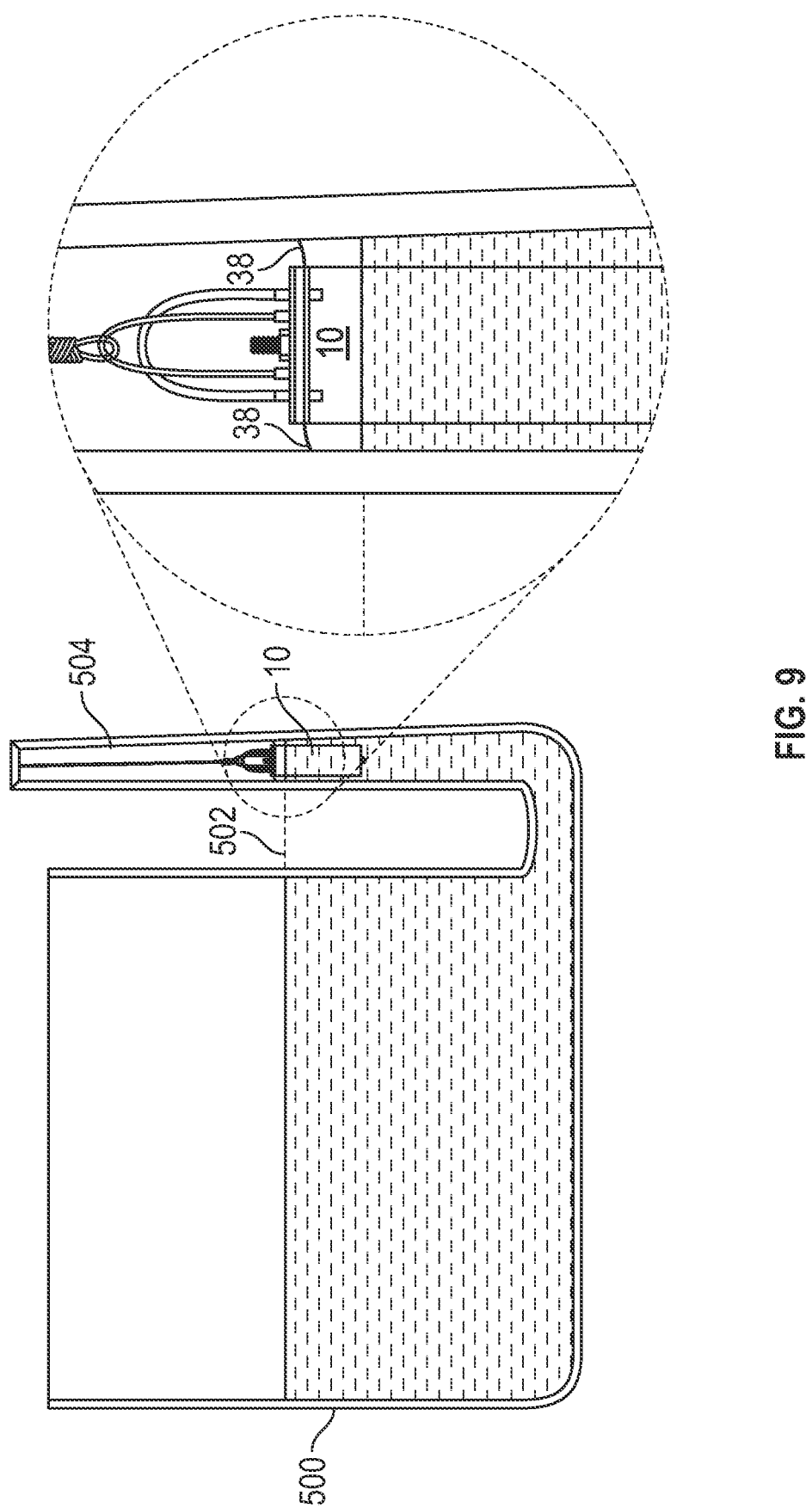
FIG. 9 is an in-use view of an example embodiment disposed in a gauge pole to demark the fluid level and lessen emissions of volatile fractions therefrom.

FIG. 9 illustrates a diagrammatic view of an example embodiment of the float assembly 10 interior to gauge pole 504. Gauge pole 504 is fluidly connected to storage vessel 500 to demark a fluid level 502 of the liquid hydrocarbon stored therein. As shown in the inset detail view inset in FIG. 9, float assembly 10 floats at the fluid atmosphere interface in gauge pole 504. Skirting 38 contacts interior of gauge pole 504 to enclose inner diameter of gauge pole 504 and prevent emissions of volatile fractions from the fluid-atmosphere interface.

Float assembly 10 is therefore devised to remain positively buoyant in an associated guide pole without corroding therein and be readily retrievable when desired. Materials of construction may include, but are contemplated not to be limited to, high density polyethylene, nylon, 304 stainless steel, 316 stainless steel, aluminum, polysulfide epoxy hybrid, polymeric MDI and polyol-closed cell foam.

What is claimed is:
1. An isolated industrial float assembly comprising:
a positively buoyant core;
an impermeable and durable tubular shell surrounding the core;
an end cap disposed at an upper end of the shell, said end cap enclosing the upper end of the shell;

a vertical member disposed longitudinally through the core, said vertical member protruding at least an upper end through the end cap and secured therethrough; and at least one looped member disposed arched over the upper end of the shell;

wherein the float assembly is positional floating interior to the gauge pole to demark and signal a fluid level therein and to lessen emissions of volatile fractions therefrom.

2. The isolated industrial float assembly of claim 1 wherein the end cap further comprises a skirting disposed to overhang the shell and contact the gauge pole to lessen emissions from the gauge pole without impeding movement of the float assembly upon the fluid level.

3. The isolated industrial float assembly of claim 2 wherein the float assembly further comprises a lower end cap disposed to enclose the lower end of the shell.

4. The isolated industrial float assembly of claim 3 wherein the lower end cap is secured in place by engagement of the vertical member therethrough.

5. The isolated industrial float assembly of claim 3 wherein the lower end cap is welded, fused, or directly attached to the shell.

6. The isolated industrial float assembly of claim 5 wherein the vertical member secures to a threadable member welded, fused, or directly attached to an interior surface of the lower end cap.

7. An isolated industrial float assembly comprising:
a positively buoyant core;
a durable, noncorrosive, impervious tubular shell surrounding the core;
an upper end cap disposed at an upper end of the shell, said upper end cap enclosing the upper end of the shell;
a flexible skirting disposed to protrude from the upper end cap, said skirting disposed to overhang the shell;
a lower end cap disposed at a lower end of the shell, said lower end cap enclosing the lower end of the shell;
a vertical member disposed longitudinally through the core, said vertical member protruding at least an upper end through the upper end cap and secured therethrough; and
at least one looped member disposed arched over the upper end of the shell;
wherein the float assembly is positional floating interior to the gauge pole to demark and signal a fluid level therein and to lessen emissions of volatile fractions therefrom.

8. The isolated industrial float assembly of claim 7 wherein the lower end cap is secured in place by engagement of the vertical member therethrough.

9. The isolated industrial float assembly of claim 8 wherein the shell is made of high quality steel.

10. The isolated industrial float assembly of claim 7 wherein the lower end cap is welded, fused, or directly attached to the shell.

11. The isolated industrial float assembly of claim 10 wherein the vertical member secures to a threadable member welded, fused, or directly attached to an interior surface of the lower end cap.

12. The isolated industrial float assembly of claim 11 wherein the shell is made of high quality steel.

13. An isolated industrial float assembly comprising:
a positively buoyant core comprising a foam resistant to corrosion when exposed to hydrocarbons, said core having a volume sufficient to displace a volume of liquid hydrocarbon exceeding the weight of the float assembly and thereby maintain positive buoyancy of the float assembly within the liquid hydrocarbon;
a tubular steel shell surrounding the core;
an upper end cap disposed at an upper end of the shell, said upper end cap enclosing the upper end of the shell;
a flexible skirting disposed to protrude from the upper end cap, said skirting disposed to overhang the shell and contact the interior of the gauge pole without impeding movement of the float assembly upon the fluid level in the gauge pole;
a lower end cap disposed at a lower end of the shell, said lower end cap enclosing the lower end of the shell;
a vertical member disposed longitudinally through the core, said vertical member protruding at least an upper end through the upper end cap and secured therethrough; and
at least one looped member disposed arched over the upper end of the shell;
wherein the float assembly is positional floating interior to the gauge pole to demark and signal a fluid level therein and to lessen emissions of volatile fractions therefrom.

14. The isolated industrial float assembly of claim 13 wherein the core is made from polymeric methylene diphenyl diisocyanate and polyol closed cell foam.

15. The isolated industrial float assembly of claim 14 wherein the shell is fabricated from 316 stainless steel.

16. The isolated industrial float assembly of claim 15 wherein the lower end cap is secured in place by engagement of the vertical member therethrough.

17. The isolated industrial float assembly of claim 15 wherein the lower end cap is welded, fused, or directly attached to the shell.

18. The isolated industrial float assembly of claim 17 wherein the vertical member secures to a threadable member welded, fused, or directly attached to an interior surface of the lower end cap.

* * * * *